(12) United States Patent
Takahashi et al.

(10) Patent No.: US 11,962,972 B2
(45) Date of Patent: Apr. 16, 2024

(54) DISPLAY DEVICE AND SPEAKER

(71) Applicant: SONY GROUP CORPORATION, Tokyo (JP)

(72) Inventors: Masahiro Takahashi, Tokyo (JP); Tatsuya Sakata, Tokyo (JP); Tetsuya Shiroishi, Tokyo (JP); Shigemi Oguchi, Tokyo (JP); Kazumasa Okamoto, Tokyo (JP); Ryosuke Nakajima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 142 days.

(21) Appl. No.: 17/309,811

(22) PCT Filed: Nov. 21, 2019

(86) PCT No.: PCT/JP2019/045617
§ 371 (c)(1),
(2) Date: Jun. 21, 2021

(87) PCT Pub. No.: WO2020/141581
PCT Pub. Date: Jul. 9, 2020

(65) Prior Publication Data
US 2022/0078560 A1    Mar. 10, 2022

(30) Foreign Application Priority Data
Dec. 31, 2018 (MY) ............................. PI2018003052

(51) Int. Cl.
*H04R 17/00* (2006.01)
*H04R 1/02* (2006.01)

(52) U.S. Cl.
CPC ............... *H04R 17/00* (2013.01); *H04R 1/02* (2013.01); *H04R 2499/15* (2013.01)

(58) Field of Classification Search
CPC ........ H04R 17/005; H04R 1/025; H04R 1/02; H04R 7/04; H04R 1/028; H04R 5/02;
(Continued)

(56) References Cited

U.S. PATENT DOCUMENTS 5,796,854 A    8/1998    Markow
5,898,137 A    4/1999    Saito
(Continued)

FOREIGN PATENT DOCUMENTS

CN    1201181 A    12/1998
CN    202949552 U    5/2013
(Continued)

OTHER PUBLICATIONS

International Search Report and Written Opinion of PCT Application No. PCT/JP2019/045617, dated Feb. 4, 2020, 12 pages of ISRWO.

(Continued)

*Primary Examiner* — Carolyn R Edwards
*Assistant Examiner* — Julie X Dang
(74) *Attorney, Agent, or Firm* — CHIP LAW GROUP

(57) ABSTRACT

To enhance a sound image localization effect and to ensure a good viewing state in which an image or video and audio have a sense of unity. Provided is a display in which an image is displayed in a display surface, a rear cover disposed on a rear side of the display, a first speaker disposed between the display and the rear cover, and a second speaker disposed between the display and the rear cover and positioned higher than the first speaker. The second speaker outputs audio according to operation of a piezoelectric element, and has a higher audio output band than the first speaker. This enables a user to feel as if the audio is being output from the display being viewed, which enhances the sound image localization (Continued)

effect and ensures a good viewing state in which an image or video and audio have a sense of unity.

5 Claims, 12 Drawing Sheets

(58) Field of Classification Search
CPC .......... H04R 1/26; H04R 7/045; H04R 1/403; H04R 1/323; H04R 2499/15; H04R 2201/025; H04N 5/64
USPC .................. 381/388, 333, 332, 335, 340
See application file for complete search history.

(56) References Cited

U.S. PATENT DOCUMENTS

| | | | | |
|---|---|---|---|---|
| 5,942,734 | A * | 8/1999 | Calvert | H04R 1/00 |
| | | | | 181/151 |
| 6,430,297 | B1 | 8/2002 | Nakamura | |
| 9,154,865 | B2 | 10/2015 | Zha et al. | |
| 2002/0150272 | A1 | 10/2002 | Nakamura | |
| 2006/0285711 | A1 * | 12/2006 | Song | H04R 1/30 |
| | | | | 381/340 |
| 2007/0081691 | A1 * | 4/2007 | Park | H04R 1/2857 |
| | | | | 381/386 |
| 2008/0307623 | A1 * | 12/2008 | Furukawa | G01H 11/08 |
| | | | | 29/25.35 |
| 2009/0196455 | A1 * | 8/2009 | Lee | H04R 1/26 |
| | | | | 381/388 |
| 2015/0181331 | A1 * | 6/2015 | Kim | H04R 3/00 |
| | | | | 381/162 |
| 2016/0105740 | A1 * | 4/2016 | Suzuki | H04R 1/26 |
| | | | | 381/333 |
| 2017/0280234 | A1 * | 9/2017 | Choi | H04R 1/025 |
| 2018/0167724 | A1 | 6/2018 | Jung et al. | |
| 2018/0270584 | A1 | 9/2018 | Murakami et al. | |

FOREIGN PATENT DOCUMENTS

| | | |
|---|---|---|
| CN | 105191349 A | 12/2015 |
| CN | 108141675 A | 6/2018 |
| EP | 0991295 A2 | 4/2000 |
| EP | 2999238 A1 | 3/2016 |
| JP | 06-62489 A | 3/1994 |
| JP | 2000-102082 A | 4/2000 |
| JP | 2005-123757 A | 5/2005 |
| JP | 2006-319723 A | 11/2006 |
| KR | 100540981 B1 | 1/2006 |
| WO | 2014/184994 A1 | 11/2014 |
| WO | 2018/061320 A1 | 4/2018 |
| WO | 2018/088774 A1 | 5/2018 |

OTHER PUBLICATIONS

Extended European Search Report of EP Application No. 19906901.4, dated Jun. 22, 2022, 12 pages.

* cited by examiner

DISPLAY DEVICE AND SPEAKER

CROSS REFERENCE TO RELATED APPLICATIONS

This application is a U.S. National Phase of International Patent Application No. PCT/JP2019/045617 filed on Nov. 21, 2019, which claims priority benefit of MY Patent Application No. PI2018003052 filed in the Japan Patent Office on Dec. 31, 2018. Each of the above-referenced applications is hereby incorporated herein by reference in its entirety.

TECHNICAL FIELD

The present technique relates to the technical field of display devices that have a display in which images are displayed in a display surface, and in which audio is output from a speaker.

BACKGROUND ART

In some display devices, such as in television receivers and personal computers, a display having a display surface in which images are displayed is provided, a speaker and the like are disposed on a rear side of the display, and the speaker and the like are covered from the rear side by a rear cover (see, for example, PTL 1).

In the display device described in PTL 1, a speaker is disposed on the rear side of a lower edge part of the display, and the speaker is covered from the rear side by a rear cover, so that audio output from the speaker passes through the lower side of the display to the front.

CITATION LIST

Patent Literature

[PTL 1]
JP 2006-319723 A

SUMMARY

Technical Problem

Incidentally, when viewing a display device, a user listens to the audio while viewing images and video displayed in the display, and thus perceiving the audio as if it is being output from the display being viewed, which creates a sense of unity between the images or video and the audio, is a desirable viewing state.

Therefore, a viewing state providing the perception that the audio can be heard from the periphery of the display is poor in terms of the sense of unity between the images or video and the audio, which may make the user feel uncomfortable with the way sound is heard in relation to the images or video, and may not provide good sound image localization.

Therefore, an object of a display device according to the present invention is to enhance a sound image localization effect and ensure a good viewing state in which an image or video and audio have a sense of unity.

Solution to Problem

First, a display device according to the present technique includes: a display in which an image is displayed in a display surface; a rear cover disposed on a rear side of the display; a first speaker disposed between the display and the rear cover; and a second speaker disposed between the display and the rear cover and positioned higher than the first speaker, wherein the second speaker outputs audio according to an operation of a piezoelectric element, and has a higher audio output band than the first speaker.

Through this, audio in a higher range than the range of the audio output from the first speaker comes from above the first speaker and progresses around the display to the front side, while audio in a lower range than the range of the audio output from the second speaker comes from below the second speaker and progresses around the display to the front side. This makes it seem as if the audio is being output from the display being viewed.

Second, in the above-described display device, preferably, when an overall height is represented by L and a bottom end is represented by 0, the second speaker is positioned between 0.7 L and 0.85 L.

This makes it easier for the audio output from the second speaker to progress around the display from the left-right direction to the front side.

Third, in the above-described display device, preferably, two of the second speakers are provided, and the two of the second speakers are positioned horizontally-separated from each other.

Therefore, an audio path can be set so that the audio output from the two second speakers is directed from the left and right sides of the display, respectively, to the front side.

Fourth, a speaker according to the present technique includes: a case body having an interior space formed as a disposition space; a piezoelectric element disposed in the disposition space and operated by application of a voltage; and a diaphragm that vibrates according to operation of the piezoelectric element and that is attached to an inner surface of the case body, wherein an audio passage hole that communicates with the disposition space and through which output audio passes is formed in the case body.

Through this, because the audio output by the vibration of the diaphragm due to voltage being applied to the piezoelectric element passes through the audio passage hole to the outside, the audio can be guided in a desired direction according to the position in which the audio passage hole is formed in the case body.

Fifth, in the above-described display device, preferably, the case body is formed having a shape in which a width increases as the case body progresses toward the audio passage hole.

This ensures the output audio travels along both sides in the width direction toward the audio passage hole, and increases the size of the audio passage hole in the width direction.

BRIEF DESCRIPTION OF DRAWINGS

FIG. 11 is a perspective view illustrating the second speaker and the like.

DESCRIPTION OF EMBODIMENTS

An embodiment for carrying out a display device according to the present technique will be described with reference to the accompanying drawings.

The following embodiment describes the display device according to the present technique being applied in a television receiver that displays images in a display.

Note that the scope of application of the present technique is not limited to television receivers, and can be widely applied to various types of display devices, such as monitors used in personal computers and the like.

In the following descriptions, the directions of front, rear, up, down, left, and right are described assuming the direction in which a display surface of the display device (television receiver) is facing is forward (the front side).

Configuration of Display Device

A display device (television receiver) 1 is, for example, formed in a substantially rectangular shape that is long sideways and thin in a front-rear direction (see FIG. 1), and is installed on an installation surface such as a floor surface using a stand 2, or is attached to a wall surface using a bracket or the like (not shown).

Figure 1:
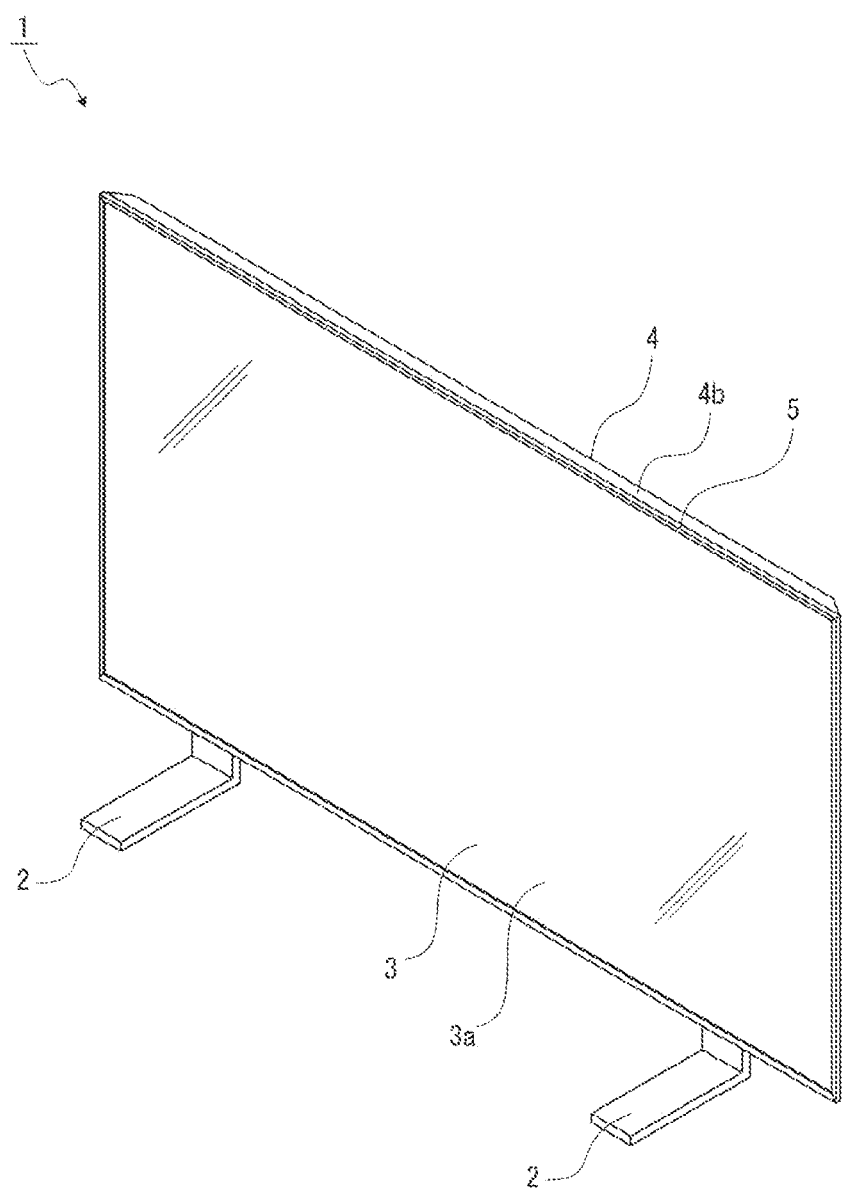
FIG. 1 illustrates, together with FIGS. 2 through 12, a display device according to the present technique, and is a perspective view illustrating a front side of the display device.
Figure 2:
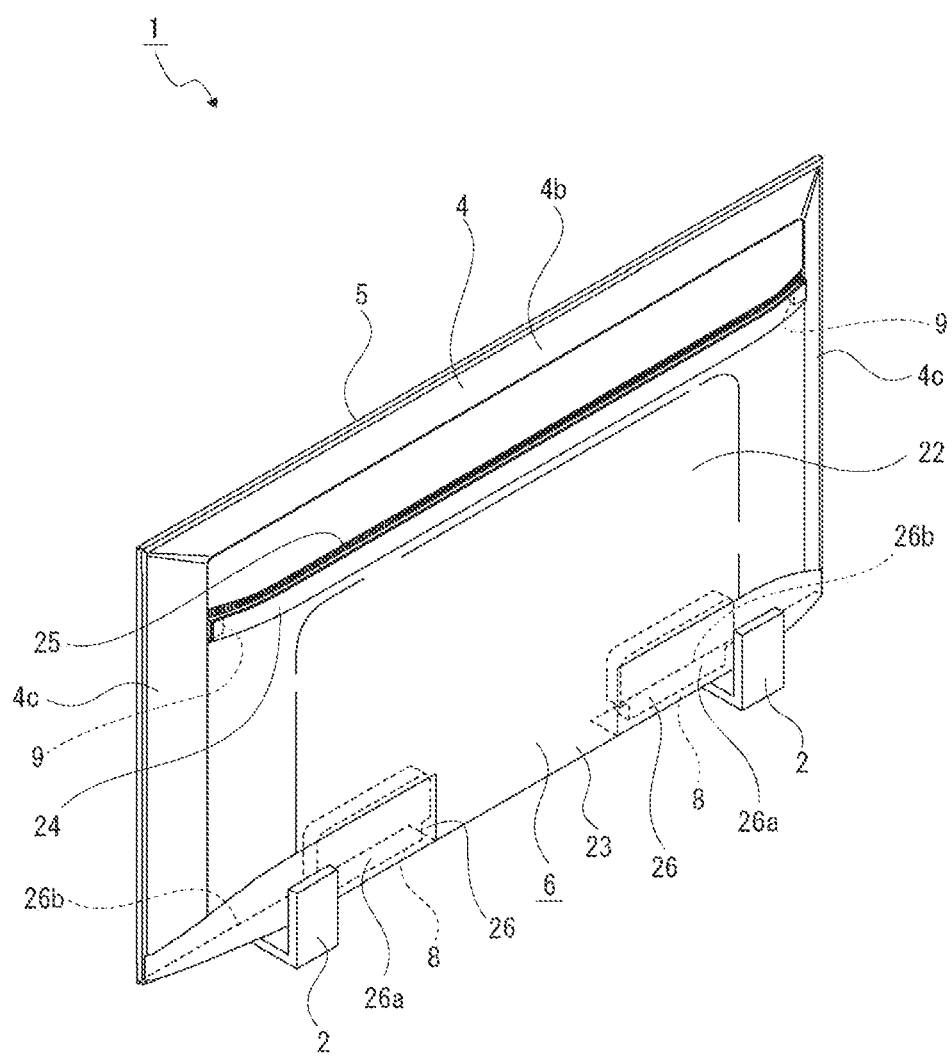
FIG. 2 is a perspective view illustrating a rear side of the display device.
Figure 3:
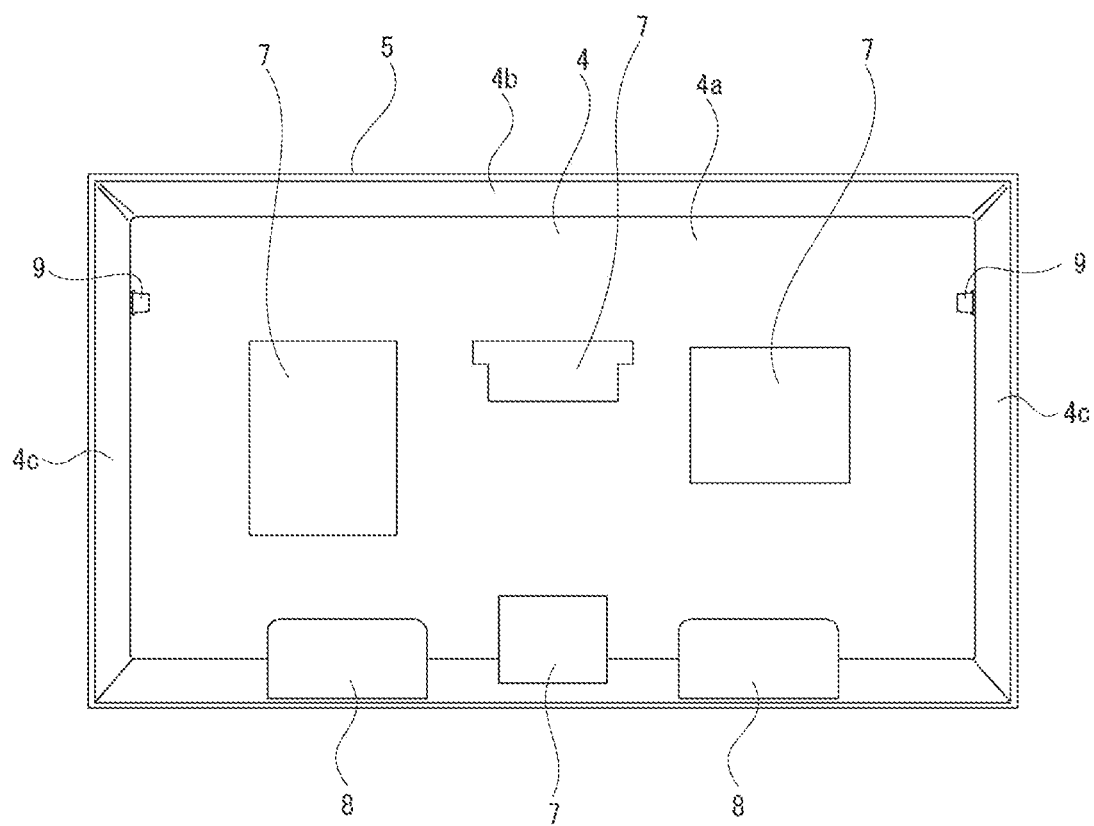
FIG. 3 is a rear view of the display device shown with a rear cover removed.

The display device 1 includes: a display 3 in which images are displayed; a back chassis 4 disposed behind the display 3; an outer frame 5, called a bezel, disposed in the outer periphery of the display 3 and back chassis 4; and a rear cover 6 that covers the back chassis 4 and the like from the rear (see FIGS. 1 to 3).

The display 3 is formed in the form of a plate facing in the front-rear direction, and a liquid crystal display is used as the display 3, for example. The display 3 has an optical sheet such as a substrate or a polarizing film. A front surface of the display 3 serves as a display surface 3a where images are displayed.

The back chassis 4 is formed from a metal material, a resin material, or the like, for example, with an outer shape that is slightly larger than the display 3 (see FIG. 3). Aside from an outer peripheral part, the back chassis 4 is provided as a base surface part 4a facing in the front-rear direction, and the outer peripheral part has a top part 4b and side parts 4c and 4c. The top part 4b is continuous with an upper end of the base surface part 4a, and is inclined so as to displace forward as the top part 4b progresses upward. The side parts 4c and 4c are continuous with left and right ends of the base surface part 4a, and are inclined so as to displace forward as the side parts 4c and 4c progress outward.

An element mounting substrate (not shown) is attached to a front surface of the base surface part 4a in the back chassis 4, and a plurality of light-emitting elements, such as light-emitting diodes, which function as a backlight, are mounted on the element mounting substrate in a matrix. A diffuser plate (not shown) that diffuses light emitted from the light-emitting elements is disposed between the element mounting substrate and the display 3.

Various control boards 7, 7, and so on are attached to a rear surface of the base surface part 4a of the back chassis 4. The control boards 7 include, for example, a power supply board that controls the supply of power for the display device 1 as a whole, a backlight board that controls the turning on and off of the light-emitting elements, a signal processing board that controls images, audio, and the like, a control board that controls the display of the display 3, and the like.

First speakers 8 and 8 are attached to the rear surface of the base surface part 4a of the back chassis 4, so as to be separated in the horizontal direction. Note that the number of the first speakers 8 may be set as desired, and may be one, or three or more. The first speakers 8 are, for example, dynamic speakers, and are attached to the lower edge part of the base surface part 4a. The first speakers 8 are, for example, speakers having an output band in the mid range to the low range, and audio from the first speakers 8 is output downward, for example.

Figure 4:
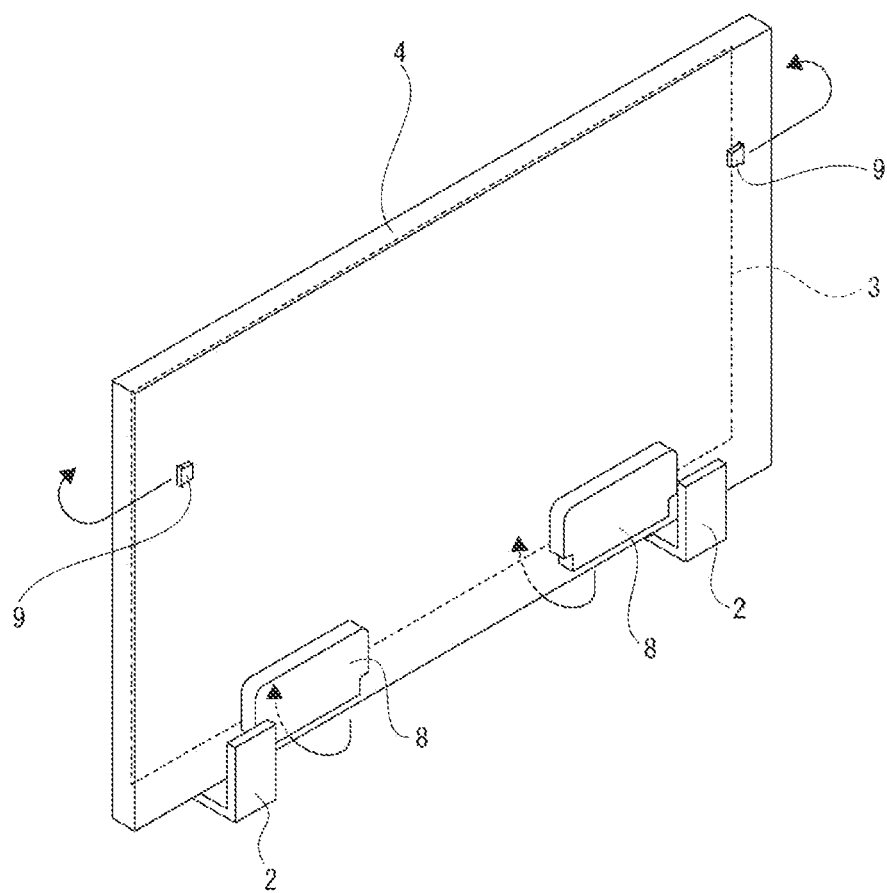
FIG. 4 is a conceptual diagram illustrating directions in which output audio travels.

The first speakers 8 and 8 are disposed in horizontally-symmetrical positions relative to the center of the display device 1 in a left-right direction. The audio output from the first speakers 8 and 8 mainly progresses around the bottom of the display 3 to the front side (see FIG. 4).

Figure 5:
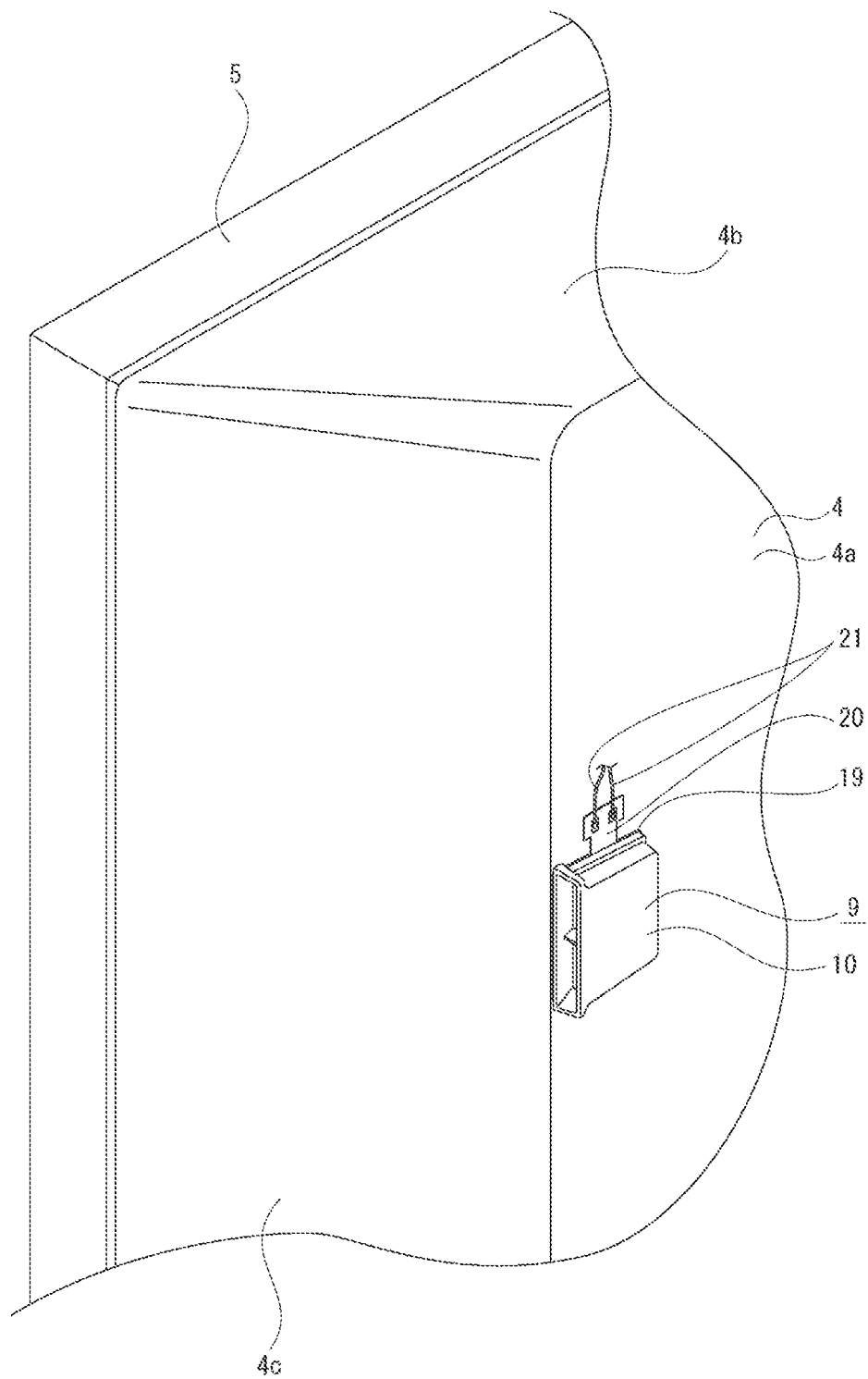
FIG. 5 is a perspective view illustrating a second speaker attached to a back chassis.

Second speakers 9 and 9 are attached to the rear surface of the base surface part 4a of the back chassis 4, so as to be separated in the horizontal direction (see FIGS. 3 and 5). Note that the number of the second speakers 9 may be set as desired, and may be one, or three or more.

As described above, two each of the first speakers 8 and the second speakers 9 are provided, with right-channel audio being output from one each of the first speakers 8 and the second speakers 9 and left-channel audio being output from the other each of the first speakers 8 and the second speakers 9, so that the audio is output in a stereo mode using right-side audio and left-side audio.

However, in the display device 1, audio may be output from the first speakers 8 and the second speakers 9 in mono mode.

Figure 6:
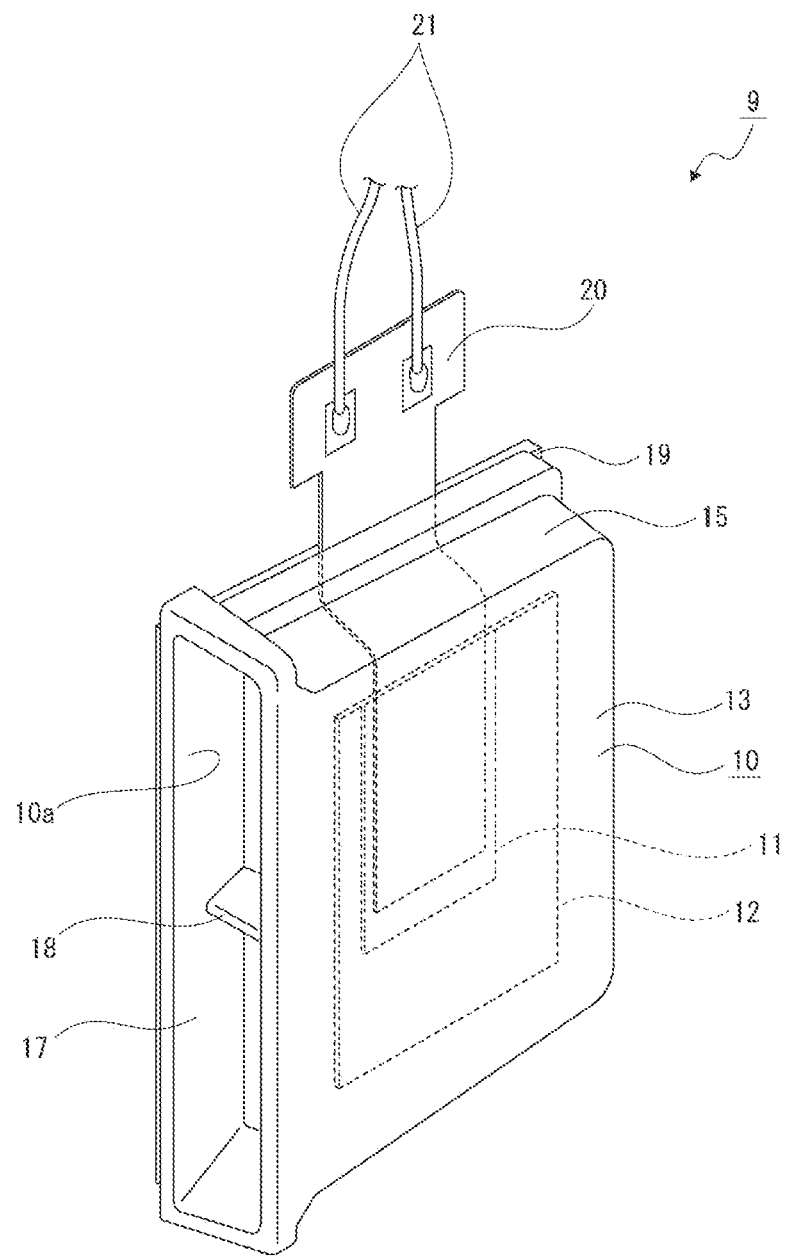
FIG. 6 is a perspective view of the second speaker.
Figure 7:
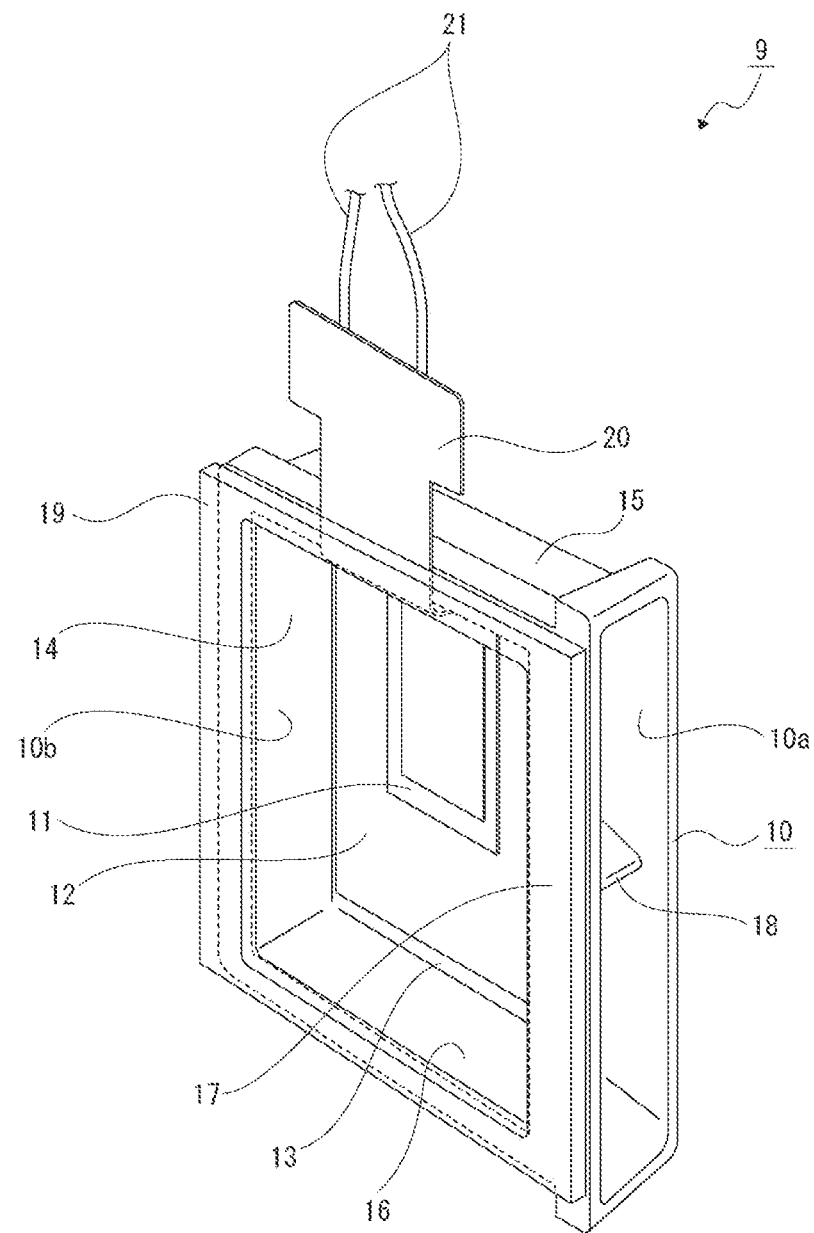
FIG. 7 is a perspective view of the second speaker, seen from a different direction from FIG. 6.

The second speakers 9 are piezoelectric element speakers (piezo speakers), each including a case body 10 formed from a resin material, a piezoelectric element 11 that operates when a voltage is applied thereto, and a diaphragm 12 that vibrates in response to the operations of the piezoelectric element 11 (see FIGS. 5 to 7).

The case body 10 is formed having a flat shape that is thin in the front-rear direction, and is constituted by a rear surface part 13, a side surface part 14, a top surface part 15, a bottom surface part 16, a connection part 17, and a reinforcement part 18, which are formed in an integral manner.

The rear surface part 13 is formed as a flat plate that faces in the front-rear direction and is larger than the side surface part 14, the top surface part 15, and the bottom surface part 16. The side surface part 14 is continuous with one side edge of the rear surface part 13, and is formed having a substantially rectangular shape longer in the vertical direction. The top surface part 15 and the bottom surface part 16 are continuous with a top edge and a bottom edge of the rear surface part 13, respectively, and are formed having substantially rectangular shapes longer in the horizontal direction, with one side edge of the top surface part 15 and one side edge of the bottom surface part 16 being continuous with top and bottom edges, respectively, of the side surface part 14.

The connection part 17 connects another end of the top surface part 15 in the left-right direction with another end of the bottom surface part 16 in the left-right direction, and is located in front of the rear surface part 13. As such, an opening surrounded by the rear surface part 13, the top surface part 15, the bottom surface part 16, and the connection part 17 is formed in the case body 10, and that opening serves as an audio passage hole 10a. The audio passage hole 10a is located on the opposite side from the side surface part 14 with respect to the left-right direction.

The reinforcement part 18 is provided in a central part of the audio passage hole 10a with respect to the up-down direction, and connects the rear surface part 13 to the connection part 17. The reinforcement part 18 prevents deformation in which the rear surface part 13 and the connection part 17 move away from each other.

A frame-shaped cushion 19 is affixed to the front surface of the case body 10. The interior space of the case body 10 is formed as a disposition space 10b, and the audio passage hole 10a communicates with the disposition space 10b.

In the case body 10, the top surface part 15 and the bottom surface part 16 are slightly inclined in such a manner that the distance therebetween in the left-right direction increases with distance from the side surface part 14. Accordingly, the distance between the top surface part 15 and the bottom surface part 16 is smallest at the end on the side surface part 14 side and greatest at the end on the audio passage hole 10a side.

The piezoelectric element 11 is, for example, formed in the shape of a plate having a thickness direction that corresponds to the front-rear direction. A wiring board 20 is connected to the piezoelectric element 11, and cables 21 are connected to the wiring board 20. Accordingly, a voltage is applied to the piezoelectric element 11 through the cables 21 and the wiring board 20. The wiring board 20 is, for example, a flexible printed wiring board, and is positioned and fixed over the inside and outside of the case body 10 while inserted between the cushion 19 and the case body 10.

The diaphragm 12 is, for example, a metal plate having a thickness direction that corresponds to the front-rear direction, and is bonded to an inner surface of the rear surface part 13. The diaphragm 12 is slightly larger than the piezoelectric element 11, and the piezoelectric element 11 is affixed to a front surface of the diaphragm 12.

As such, when a voltage is applied to the piezoelectric element 11 through the cables 21 and the wiring board 20 and the piezoelectric element 11 deforms, the diaphragm 12 deforms and vibrates according to the deformation of the piezoelectric element 11. The vibration of the diaphragm 12 is transmitted to the case body 10 as well, and the case body 10 vibrates according to the vibration of the diaphragm 12.

With the second speakers 9, the case body 10 is attached to the base surface part 4a of the back chassis 4 over the cushion 19, and because the case body 10 is attached to the base surface part 4a over the cushion 19, the case body 10 is capable of vibrating relative to the back chassis 4.

Figure 8:
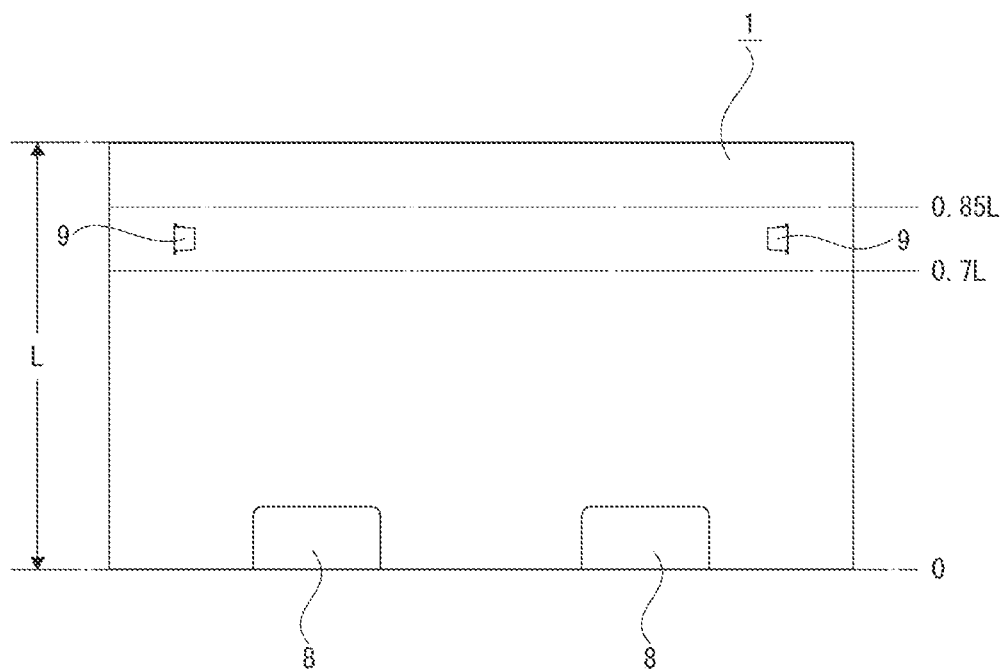
FIG. 8 is a rear view illustrating the disposition locations of second speakers.

The second speakers 9 and 9 are mounted near the left and right ends of the back chassis 4, for example, on the left and right ends of the base surface part 4a, with the audio passage holes 10a and 10a on outer sides of the side surface part 14 in the left-right direction, and on the upper half of the back chassis 4 in the up-down direction, above the first speakers 8 and 8. Specifically, when the height of the display device 1 as a whole is represented by L and a bottom end by 0, the second speakers 9 and 9 are positioned between 0.7 L and 0.85 L (see FIG. 8).

The second speakers 9 are, for example, speakers having an output band that is in the high to mid range, or the high range, and audio is emitted to the sides through the audio passage holes 10a. The audio output from the second speakers 9 and 9 mainly progresses around the sides of the display 3 to the front side (see FIG. 4). Additionally, in the second speakers 9, the case body 10 vibrates in addition to the diaphragm 12, and thus the audio is output from the periphery of the case body 10 as well.

Figure 9:
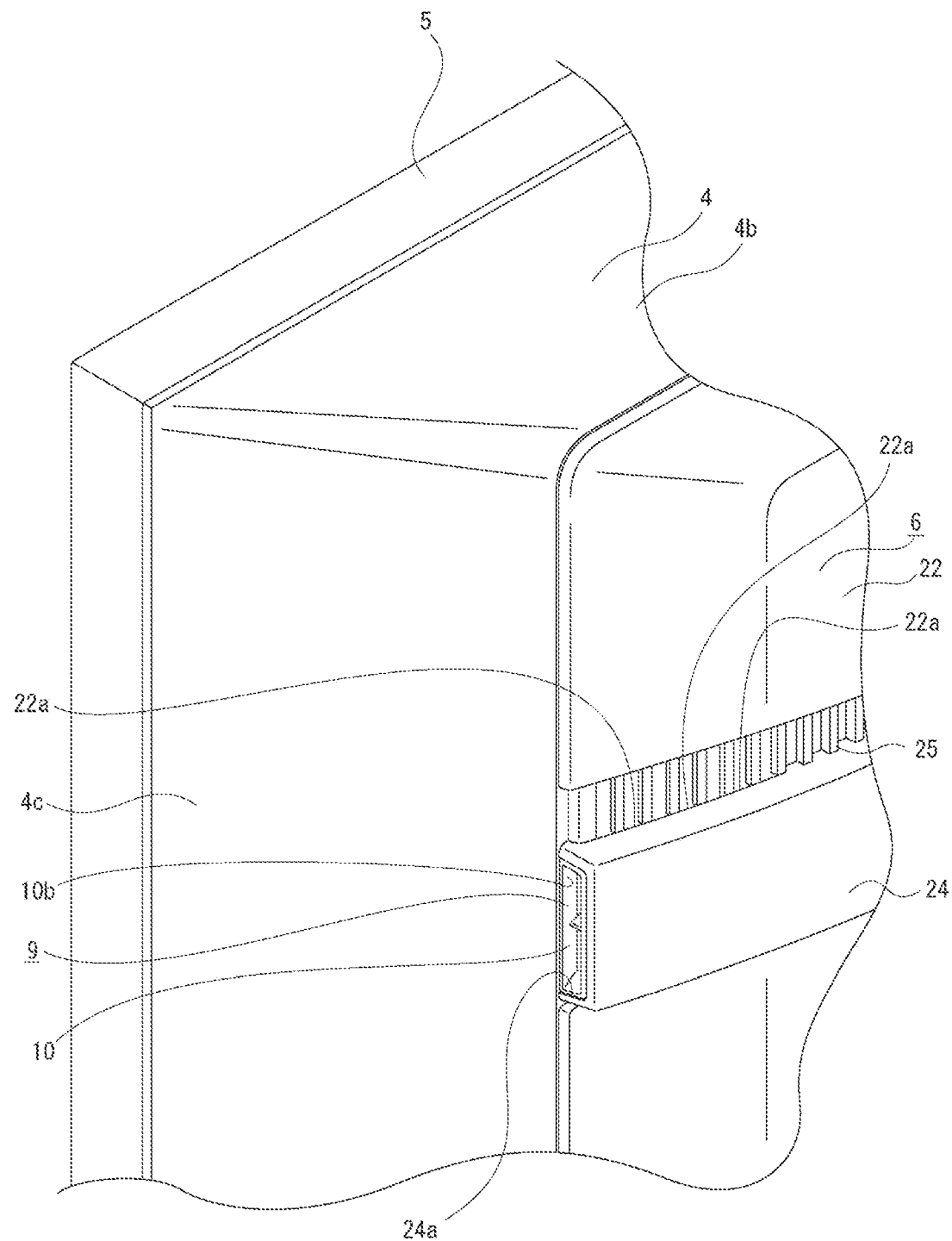
FIG. 9 is a perspective view illustrating part of the display device.

The outer frame 5 is, for example, constituted by four parts located at the top, bottom, left and right, joined together, and is attached to an outer peripheral part of the back chassis 4 from the outer side (see FIGS. 2 and 9).

The rear cover 6 is slightly smaller than the back chassis 4, and a part thereof aside from a lower edge part is provided as a main body part 22 (see FIG. 2). The rear cover 6 has a protruding part 23 projecting downward from a central part, in the left-right direction, of the main body part 22, and left and right sides of the protruding part 23 are formed as placement cutouts 6a and 6a.

A band part 24 extending to the left and right is provided on a part of the main body part 22 near the upper end thereof, and the band part 24 is formed in a shape that is open both to the front and to the left and right (see FIG. 9). The left and right openings of the band part 24 are formed as emission holes 24a and 24a. The main body part 22 includes a decorative part 25 continuous with an upper end of the band part 24, and the decorative part 25 is constituted by a plurality of projections and recesses arranged so as to alternate in the left-right direction.

At both the left and right ends of the main body part 22, small holes 22a, 22a, and so on, which penetrate in the up-down direction, are formed at the continuous part between the band part 24 and the decorative part 25. The small holes 22a, 22a, and so on are formed by machining the main body part 22 so that there is a gap between the recesses of the decorative part 25 and the band part 24, and are connected to a space inside the band part 24.

Like the side parts 4c and 4c of the back chassis 4, the left and right end parts of the main body part 22 are inclined so as to displace forward as the end parts progress outward.

The rear cover 6 is attached to the back chassis 4 so as to cover the base surface part 4a from behind (see FIG. 2). With the rear cover 6 attached to the back chassis 4, the control boards 7, 7, and so on are covered from behind by the main body part 22 or the protruding part 23, the first speakers 8 and 8 are located in the placement cutouts 6a and 6a, respectively, and the second speakers 9 and 9 are covered from behind by the left and right ends of the band part 24, respectively.

With the rear cover 6 attached to the back chassis 4, covers 26 and 26, which cover the placement cutouts 6a and 6a, respectively, are attached to the rear cover 6 from behind, and the covers 26 and 26 cover the first speakers 8 and 8, respectively. Each cover 26 has a rear-side cover part 26a facing in the front-rear direction and a lower-side cover part 26b protruding forward from a lower edge part of the rear-side cover part 26a, and a mesh-shaped emission part is formed in the lower-side cover part 26b.

Accordingly, audio in the mid range to the low range, output from the first speaker 8, is emitted downward from the emission part of the lower-side cover part 26b, and progresses around the bottom of the display 3 to the front side.

On the other hand, audio in the high to mid range, or the high range, output from the second speakers 9 is mainly emitted from the audio passage hole 10a of the case body 10 to the side through the emission holes 24a in the band part 24, and progresses around the sides of the display 3 to the front side. Some of the audio output from the second speakers 9 is released upward from the case body 10 through the small holes 22a, 22a, and so on formed in the main body part 22, and progresses around the top of the display 3 to the front side.

Conclusion

As described above, the display device 1 includes the first speakers 8, which are disposed between the display 3 and the rear cover 6, and the second speakers 9, which are disposed between the display 3 and the rear cover 6 and are positioned higher than the first speakers 8; and each of the second speakers 9 outputs audio according to operations of the piezoelectric element 11, and has a higher audio output band than the first speakers 8.

As such, audio in a higher range than the range of the audio output from the first speakers 8 comes from above the first speakers 8 and progresses around the display 3 to the front side, while audio in a lower range than the range of the audio output from the second speakers 9 comes from below the second speakers 9 and progresses around the display 3 to the front side.

This enables a user to feel as if the audio is being output from the display being viewed, which enhances the sound image localization effect and ensures a good viewing state in which an image or video and audio have a sense of unity.

In particular, it is easier for the user to feel as if the audio output from the first speakers 8 around the display 3 and the audio output from the second speakers 9 around the display 3 are both coming from the center of the display 3 being viewed, which makes it possible to ensure a realistic viewing state in which the image or video and audio have a sense of unity.

Additionally, when the height of the display device 1 as a whole is represented by L and the bottom end by 0, the second speakers 9 are positioned between 0.7 L and 0.85 L.

As such, the second speakers 9, which output audio in a higher range than the first speakers 8, are positioned within a predetermined range near the upper end, and thus the audio output from the second speakers 9 can easily move around the display 3 from the left-right direction and progress toward the front side, which makes it possible to ensure a high sound image localization effect.

Furthermore, two of the second speakers 9 and 9 are provided, and the two second speakers 9 and 9 are positioned horizontally-separated from each other.

Therefore, the audio path can be set so that the audio output from the two second speakers 9 and 9 is directed from the left and right sides of the display 3, respectively, to the front side, which provides a sense of a broad sound image and good sound image localization, and makes it possible to ensure a realistic viewing state for the user.

In particular, by attaching the two second speakers 9 and 9 to locations near the left and right ends of the back chassis 4, the audio output from the second speakers 9 and 9 can more easily move around the display 3 from the left and right sides thereof, which makes it possible to obtain an even better sense of a broad sound image and better sound image localization.

Additionally, each of the second speakers 9 includes the case body 10, the piezoelectric element 11, and the diaphragm 12, and the audio passage hole 10a, which communicates with the disposition space 10b and through which output audio passes, is formed in the case body 10.

Accordingly, because the audio output by the vibration of the diaphragm 12 due to voltage being applied to the piezoelectric element 11 passes through the audio passage hole 10a to the outside, the audio can be guided in a desired direction according to the position in which the audio passage hole 10a is formed in the case body 10, which makes it possible to enhance the sound image localization and ensure a good viewing state.

Furthermore, because the case body 10 is formed having a shape in which the width increases as the case body 10 progresses toward the audio passage hole 10a, the output audio progresses along the top surface part 15 and bottom surface part 16, which are both side surface parts in the width direction, toward the audio passage hole 10a, and the size of the audio passage hole 10a increases in the width direction, which makes it possible to smoothly emit audio at a high sound pressure from the audio passage hole 10a.

Other

Although the foregoing describes an example in which the second speakers 9 and 9 are disposed in positions near the left and right ends of the back chassis 4, the second speakers 9 and 9 can be disposed at any positions, as long as the second speakers 9 and 9 are higher than the first speakers 8.

Figure 10:
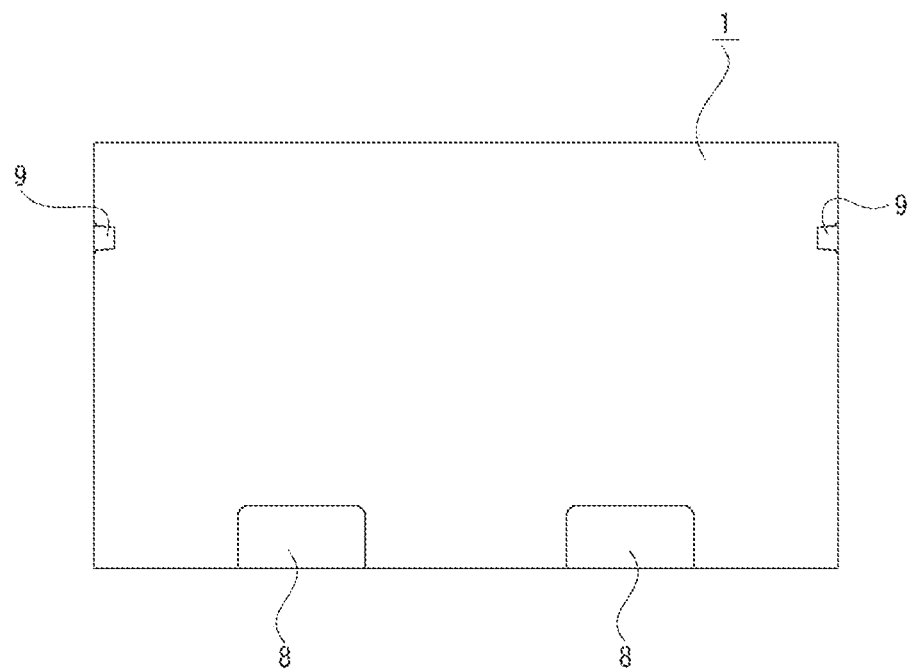
FIG. 10 is a rear view illustrating another example of the disposition of the second speakers.

The second speakers 9 and 9 may be positioned, for example, at left and right ends of the back chassis 4 (see FIG. 10). By disposing the two second speakers 9 and 9 at the left and right ends of the back chassis 4, the audio output from the second speakers 9 and 9 can more easily move around the display 3 from the left and right sides thereof, which makes it possible to obtain a sense of a broad sound image and good sound image localization.

Figure 11:
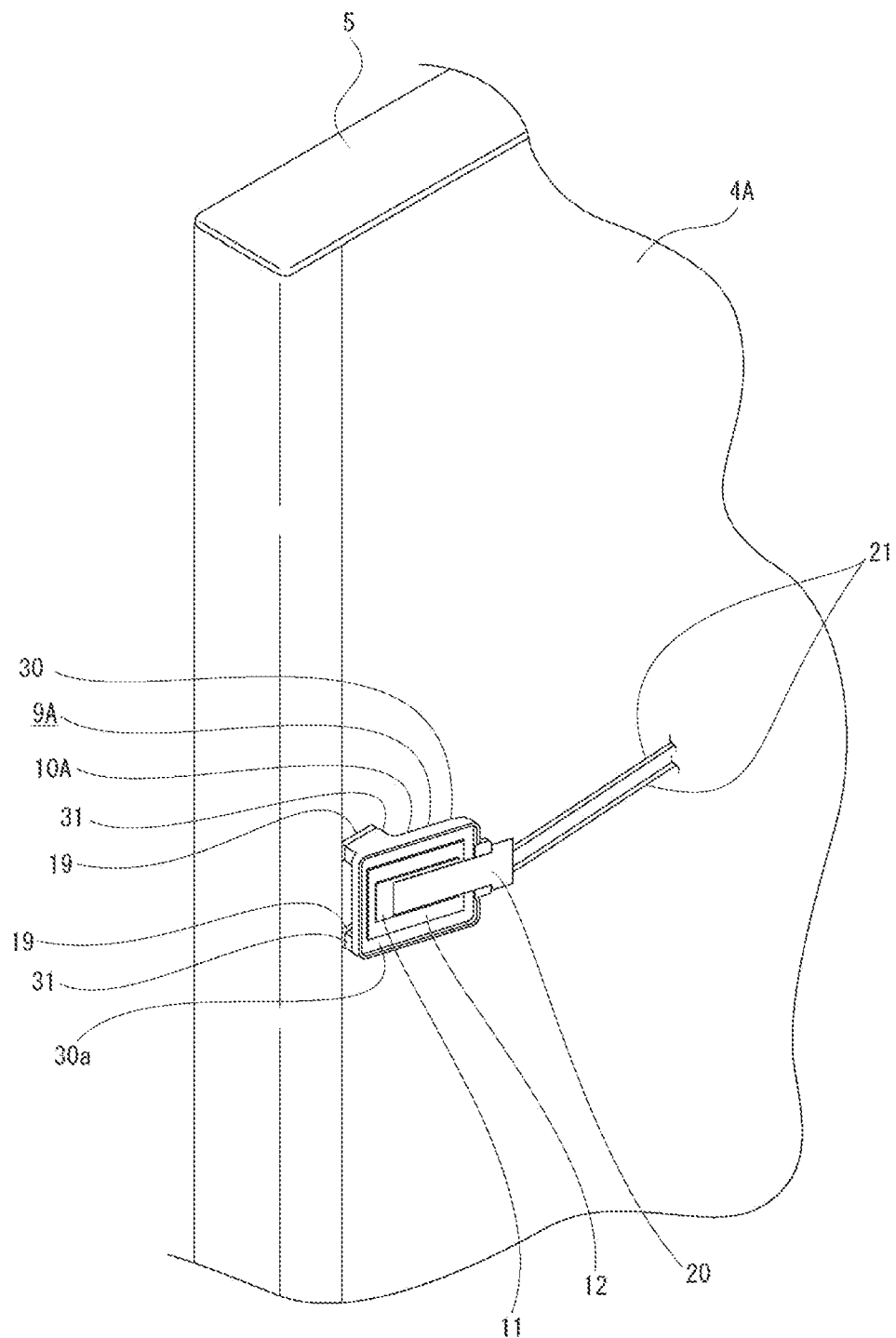
Figure 12:
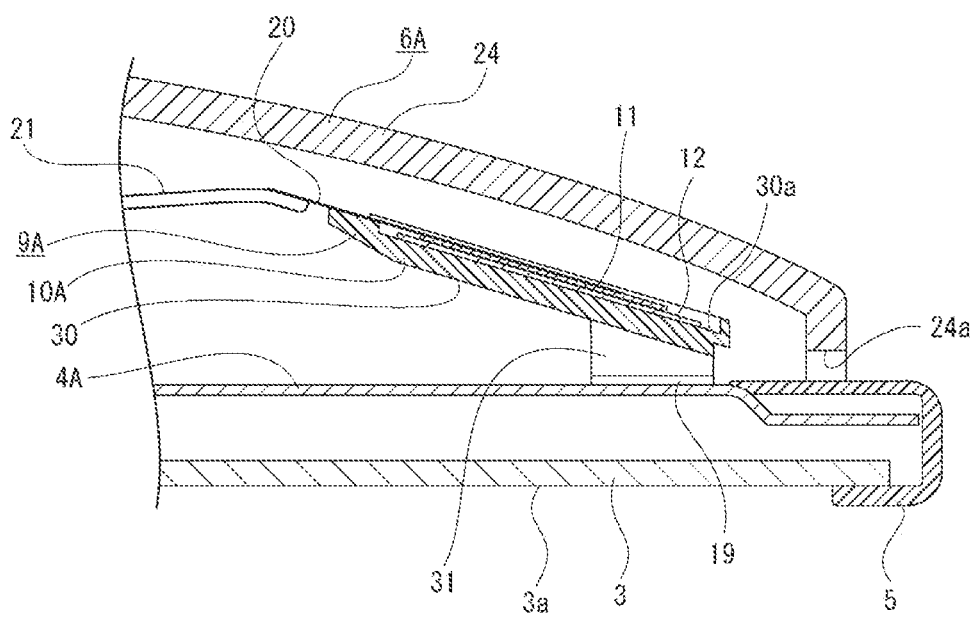
FIG. 12 is a cross-sectional view illustrating another second speaker attached to the back chassis.

Additionally, although the foregoing describes the second speakers 9, each including the case body 10 having the interior space 10b, as an example, it is also possible to use second speakers 9A, in which the configuration of the case body is different, instead of the second speakers 9 (see FIGS. 11 and 12).

Each of the second speakers 9A includes a case body 10A formed from a resin material, the piezoelectric element 11 that operates when a voltage is applied thereto, and the diaphragm 12 that vibrates in response to the operations of the piezoelectric element 11.

The case body 10A includes an attachment part 30 to which the diaphragm 12 is attached, and leg parts 31 and 31 protruding from the attachment part 30. The attachment part 30 is formed as a plate having a substantially rectangular shape, and has a shallow recess part 30a open on one side in the thickness direction. The leg parts 31 and 31 protrude from the other side, in the thickness direction, of the attachment part 30, and are separated from each other in the up-down direction. The attachment part 30 is inclined relative to the direction in which the leg parts 31 protrude. Cushions 19 and 19 are affixed to tip surfaces of the leg parts 31 and 31, respectively.

The diaphragm 12 is bonded to the attachment part 30 with the diaphragm 12 disposed in the recess part 30a.

In the example in which the second speakers 9A are used, for example, a back chassis 4A is used, and the entire back chassis 4A is formed as a substantially flat plate. Additionally, in the example in which the second speakers 9A are used, for example, a rear cover 6A is used, the rear cover 6A being formed at substantially the same size as the back chassis 4A, and having left and right end parts that are inclined so as to move closer to the back chassis 4A as the left and right end parts approach both ends in the left-right direction.

In each of the second speakers 9A, the leg parts 31 and 31 of the case body 10A are attached to end parts, in the left-right direction, of the back chassis 4A, over the cushions 19 and 19, and the case body 10A is attached to the back chassis 4A over the cushions 19 and 19 using double-sided tape, which makes it possible for the case body 10A to vibrate relative to the back chassis 4A. Alternatively, the case body 10A can be attached with screws.

In each of the second speakers 9A, the attachment part 30 of the case body 10A is inclined, and the attachment part 30 is positioned so as to follow the inclined state of the rear cover 6A while being attached to the back chassis 4A. Accordingly, the piezoelectric element 11 and the diaphragm 12, which are attached to the attachment part 30, are positioned opposite each other while substantially parallel to the inner surface of the rear cover 6A.

The audio output from the second speakers 9A is emitted to the sides through the emission holes 24a, and progresses around the sides of the display 3 to the front side.

Note that in the example where the second speakers 9A are used, emission holes that penetrate in the front-rear direction may be formed in the rear cover 6A at positions opposite the piezoelectric element 11 and the diaphragm 12, and when such emission holes are formed, the audio output from the second speakers 9A is emitted to the rear through the emission holes, and progresses around the sides and above the display 3 to the front side.

Additionally, the small holes 22a, 22a, and so on may be formed in the rear cover 6A, and when the small holes 22a, 22a, and so on are formed, the audio output from the second speakers 9A is emitted upward through the small holes 22a, 22a, and so on, and progresses around the top of the display 3 to the front side.

When the second speakers 9A are used as described above, the case body 10A is formed substantially in a plate shape, and the second speakers 9A can be disposed in a small space by varying the lengths of the leg parts 31 and 31 from the attachment part 30 in the protrusion direction in accordance with the space for disposition. This makes it possible to miniaturize the second speakers 9A, and effectively utilizing the space makes it possible to increase the freedom of design.

Additionally, because the second speakers 9A and 9a can be disposed at the left and right ends, the audio output from the second speakers 9A and 9A can more easily move around the display 3 from the left and right sides thereof, which makes it possible to obtain a sense of a broad sound image and good sound image localization.

Present Technique

The present technique can be configured as described below.

(1)
A display device includes:
a display in which an image is displayed on a display surface;
a rear cover disposed on a rear side of the display;
a first speaker disposed between the display and the rear cover; and
a second speaker disposed between the display and the rear cover and positioned higher than the first speaker, wherein
the second speaker outputs audio according to an operation of a piezoelectric element, and has a higher audio output band than the first speaker.

(2)
The display device according to (1), wherein
when an overall height is represented by L and a bottom end is represented by 0, the second speaker is positioned between 0.7 L and 0.85 L.

(3)
The display device according to (1) or (2), wherein
two of the second speakers are provided, and
the two of the second speakers are positioned horizontally-separated from each other.

(4)
A speaker including;
a case body having an interior space formed as a disposition space;
a piezoelectric element disposed in the disposition space and operated by application of a voltage; and
a diaphragm that vibrates according to operation of the piezoelectric element and that is attached to an inner surface of the case body, wherein
an audio passage hole that communicates with the disposition space and through which output audio passes is formed in the case body.

(5)
The speaker according to (4), wherein
the case body is formed having a shape in which a width increases as the case body progresses toward the audio passage hole.

REFERENCE SIGNS LIST

1 Display device
3 Display
3A Display surface
6 Rear cover
8 First speaker
9 Second speaker
10 Case body
10a Audio passage hole
10b Disposition space
11 Piezoelectric element
12 Diaphragm
9A Second speaker
10A Case body

The invention claimed is:
1. A display device, comprising:
a display configured to display an image on a display surface of the display;
a rear cover on a rear side of the display;
a first speaker between the display and the rear cover; and
a second speaker between the display and the rear cover and positioned higher than the first speaker, wherein
the second speaker is configured to output audio based on an operation of a piezoelectric element of the second speaker,
the second speaker has a higher audio output band than the first speaker, and
the second speaker includes:
a case body that includes:
a rear surface part,
a side surface part continuous with a side edge of the rear surface part, wherein the side surface part is on a first side of the case body,
a top surface part continuous with a top edge of the rear surface part, a bottom surface part continuous with a bottom edge of the rear surface part, an interior space as a disposition space, an audio passage hole, that communicates with the disposition space, wherein the audio passage hole is configured to pass the audio, the audio passage hole corresponds to an opening surrounded by the rear surface part, the top surface part, and the bottom surface part, the audio passage hole is on a second side of the case body opposite to the first side in a first direction, and a reinforcement part in a central part of the audio passage hole with respect to a second direction orthogonal to the first direction, and the piezoelectric element in the disposition space.

2. The display device according to claim 1, wherein, when an overall height of the display device is represented by L and a bottom end of the display device is represented by 0, the second speaker is positioned between 0.7 L and 0.85 L.

3. The display device according to claim 1, further comprising a speaker horizontally-separated from the second speaker.

4. A speaker, comprising:
a case body that includes:
a rear surface part,
a side surface part continuous with a side edge of the rear surface part,
wherein the side surface part is on a first side of the case body, a top surface part continuous with a top edge of the rear surface part, a bottom surface part continuous with a bottom edge of the rear surface part, an interior space as a disposition space, an audio passage hole that communicates with the disposition space, wherein the audio passage hole corresponds to an opening surrounded by the rear surface part, the top surface part, and the bottom surface part, the audio passage hole is on a second side of the case body opposite to the first side in a first direction, and the audio passage hole is configured to pass output audio, and a reinforcement part in a central part of the audio passage hole with respect to a second direction orthogonal to the first direction;

a piezoelectric element in the disposition space, wherein the piezoelectric element is configured to be operated by application of a voltage; and a diaphragm configured to vibrate based on operation of the piezoelectric element, wherein the diaphragm is on an inner surface of the case body.

5. The speaker according to claim 4, wherein the case body has a shape in which a width increases as the case body progresses toward the audio passage hole.

* * * * *